United States Patent [19]

Banzi et al.

[11] Patent Number: 4,529,716

[45] Date of Patent: Jul. 16, 1985

[54] CATALYSTS COMPONENTS AND CATALYSTS FOR THE POLYMERIZATION OF OLEFINS

[75] Inventors: Viviano Banzi; Barbé Pier C.; Luciano Noristi, both of Ferrara, all of Italy

[73] Assignee: Montedison S.p.A., Milan, Italy

[21] Appl. No.: 530,703

[22] Filed: Sep. 9, 1983

[30] Foreign Application Priority Data

Sep. 10, 1982 [IT] Italy ................. 23198 A/82

[51] Int. Cl.$^3$ ............................................. C08F 4/64
[52] U.S. Cl. ..................... 502/121; 502/105; 502/123; 502/125; 502/126; 502/127; 502/128; 502/134; 526/125
[58] Field of Search ............... 502/105, 121, 125, 126, 502/127, 128, 134, 123

[56] References Cited

U.S. PATENT DOCUMENTS 4,242,231 12/1980 Ueno et al. ................. 502/127
4,242,480 12/1980 Welch ...................... 502/105 X
4,282,114 8/1981 Ito et al. ..................... 502/105

FOREIGN PATENT DOCUMENTS 2033409A 5/1980 United Kingdom ........... 502/127

Primary Examiner—Patrick P. Garvin

[57] ABSTRACT

Catalyst components for the stereoregular polymerization of alpha-olefins, comprising a Ti halide and an electron-donor compound supported on an anhydrous magnesium dihalide and obtained by means of non-extractive treatments, with liquids having a dielectric constant at 20° C. equal to or higher than 2, of compositions comprising an anhydrous Mg dihalide, the crystallites of which have an average size lower than 300 Å.

The present invention refers to new catalyst components and the catalysts obtained therefrom for the polymerization of alpha-olefins $Ch_2=CHR$, wherein R is an alkyl radical with 1–4 C atoms or an aryl radical, and of mixtures of said alpha-olefins with minor amounts of ethylene.

18 Claims, No Drawings

CATALYSTS COMPONENTS AND CATALYSTS FOR THE POLYMERIZATION OF OLEFINS

BACKGROUND OF THE INVENTION

Supported catalysts, endowed with high activity in the polymerization of alpha-olefins are known and are obtained by the reaction of an Al-alkyl compound with catalyst components comprising a Ti compound, in particular $TiCl_4$, and an electron-donor compound supported on a Mg dihalide in active form.

The Mg dihalide in active form shows halos in the X-rays powder spectrum in the place of the most intense diffraction lines which appear in the powder spectrum of the normal Mg dihalide.

Examples of such catalysts are disclosed in U.S. Pat. Nos. 4,107,413; 4,107,414 and 4,226,741.

A peculiar feature of the supported catalysts endowed with higher stereospecificity and activity in the polymerization of the alpha-olefins is that of being prepared according to methods which lead to the formation of components comprising the Ti compound supported on the magnesium dihalide, which do not contain or contain only low percentages of Ti compounds extractable in hot conditions with boiling heptane and with $TiCl_4$.

The preparation of these catalysts is generally carried out in conditions in which the solid comprising the magnesium dihalide in active form is reacted in suspension in the Ti compound; the excess of Ti compound is then removed by filtration at temperatures at which no Ti compounds extractable with boiling heptane and with $TiCl_4$ at 80° C. remain on the solid; the solid is then repeatedly washed with hydrocarbon solvents to remove any traces of soluble Ti compound.

According to other methods, the Mg dihalide, the electron-donor compound and the Ti compound, optionally in the presence of grinding coadjuvants, are co-milled until activation of the magnesium dihalide, i.e. until appearance, in the X-rays powder spectrum of the Mg dihalide, of halos in the place of the most intense lines which appear in the powder spectrum of the normal magnesium dihalide.

The solid is then subjected to a hot treatment with a hydrocarbon solution of a halogenated hydrocarbon compound and the liquid phase is separated by hot filtering in order to remove the soluble compounds. The solid is then further washed with an aliphatic hydrocarbon.

Examples of these methods are described in published European Patent Application Nos. 0004789 and 0004791.

According to another method, the solid catalyst component obtained by co-milling a Mg dihalide and an electron-donor compound and by successive treatment with an excess of $TiCl_4$ in hot conditions is further treated in suspension in a halogenated hydrocarbon solvent, is separated from the liquid phase and finally repeatedly washed with a hydrocarbon solvent (U.S. Pat. No. 4,146,502).

All the solid catalyst components obtained according to the methods mentioned hereinabove do not contain, or contain only small percentages of Ti compounds not extractable with heptane and with $TiCl_4$.

THE PRESENT INVENTION

It has now surprisingly been found that it is possible to prepare catalyst components suitable for the stereoregular polymerization of the alpha-olefins, which components are endowed with high activity and stereospecificity, by methods which do not involve extractive and/or washing of the solid comprising the Ti compound supported on the Mg dihalides in the active form.

Contrary to any expectations, the catalyst components of the invention form particularly active and stereospecific catalysts in the polymerization of the alpha-olefins although they contain Ti compounds extractable with heptane and $TiCl_4$ in hot conditions.

The most representative catalyst components are obtained, according to methods in which the Mg dihalide in active form, the Ti compound and the electron-donor compound are subjected to non-extractive treatments with a liquid substance having particular characteristics of polarity and in which the product obtained from the treatment and comprising the liquid substance containing, dissolved therein, by-products extractable with heptane and $TiCl_4$ in hot conditions, is used as a catalyst component, or the solid portion from which the liquid phase has been removed by evaporation is so used.

Since the catalyst components according to the invention are obtained by methods quite in contrast with the techniques of the art, it is unexpected that the present components form catalysts, the activity and stereospecificity of which, are comparable with, and in some cases higher than, the activity and stereospecificity of the corresponding catalysts, the solid component of which has been subjected to accurate extractive and washing treatments.

Advantages and simplifications in the preparation process brought about by the new catalyst components are apparent.

In fact, there are no longer required the expensive steps of separating and washing the powders which do not sediment except with difficulty, and of recovering and rectifying the liquids containing solid by-products dissolved therein.

The catalyst components of the invention comprise a solid (a) containing a Ti halide and an electron-donor compound (ED) not containing active hydrogen atoms, which are both supported on an anhydrous magnesium dihalide the crystallites thereof having average sizes below 300 Å, in which the molar ratio of ED compound to Ti halide ranges from 0.2 to 3 and the molar ratio of ED compound to magnesium dihalide ranges from 0.05 to 0.3, the solid (a) or the product comprising the solid (a) being obtained by a non-extractive treatment accomplished with an activating substance (c) on a composition (b) comprising an anhydrous magnesium dihalide the crystallites of which have average sizes lower than 300 Å or comprising said magnesium halide containing, supported on it, a Ti halide and/or an ED compound until (1) the surface area of (b) increases by at least three times, such increase not involving a decrease in the average size of the magnesium dihalide crystallites, or (2) until the average size of the magnesium dihalide crystallites increases by at least 5%, the increase in the average size not involving a decrease in the surface area of (b).

The substance (c) is liquid in the treatment conditions, inert towards the compounds forming the catalyst components and has a dielectric constant at 20° C. equal to or higher than 2, and furthermore is used in an amount higher than 10% by weight in respect of the magnesium dihalide and is left, at the end of the treatment, in whole or in part, in contact with (a), or, if removed, is removed by evaporation, the Ti halide and/or the ED compound being supported on the magnesium dihalide during or after the treatment with substance (c) at least when said compounds are not already present in a supported form on the magnesium dihalide.

In the above definition of the invention, by "Ti halide and/or electron-donor compound ED supported on magnesium halide" there is meant the Ti halide and/or the ED compound and/or the complexes thereof which remain fixed on the carrier after extractive treatment with boiling 1,2-dichloroethane for two hours, using a solid concentration of 5% by weight.

Average size D(110) of the crystallites of the magnesium dihalide means value D(100) resulting from the measure of the half peak breadth of the diffraction line (110) which appears in the X-rays powder spectrum of the magnesium dihalide, by applying the Sherrer equation:

$$D(110) = \frac{K \cdot 1.542 \cdot 57.3}{(B - b) \cos \theta}$$

wherein
K = a constant (0.915 in the case of magnesium chloride, and 1 in the case of the other magnesium dihalides);
B = half peak breadth (in degrees) of the diffraction line (110);
b = instrumental broadening;
$\theta$ = Bragg angle.

In the case of magnesium chloride, the diffraction line (110) appears at an angle $2\theta$ of 50.2°.

The X-rays spectrum is obtained by means of an apparatus equipped with an X-rays generator fitted with a Cu anode tube, by using a CuK$\alpha$ radiation, a scintillating goniometer, a 36 KV voltage, an 18 mA current, a Ni filter.

The determination of the surface area (according to method BET) of solid (a) is carried out on a solid obtained under standard conditions which provide the separation by filtration of liquid (c), if any, and the washing of the solid with n-heptane at room temperature until disappearance of the halogen ions in the reaction washing liquid. Substance (c), which is inert towards the compounds forming the catalyst components, is not reactive towards magnesium dihalide; if it is reactive towards Ti halide, compound ED and/or the Al alkyl used as a co-catalyst, it must not form catalytically inactive reaction products or products capable of inhibiting the catalytic action.

The Ti halides used in the preparation of the catalyst component and which are present in a supported form on said component comprise at least a Ti-halogen bond. The Ti tetrahalides and, in particular, Ti tetrachloride are the preferred compounds. The Ti halogen-alcoholates are suitable too, and among them the Ti halogen-aryloxy-derivatives, such as e.g., Ti trichloro-phenoxy and Ti trichloro-2,6-di-t.butylphenoxy, are preferred.

The Ti trihalides, in particular $TiCl_3$ and compositions $3TiCl_3 \cdot AlCl_3$, are also useful.

The amount of titanium halide present in the supported form on the magnesium dihalide is preferably such that the molar ratio to the ED compounds, which is present in the supported form as well, ranges from 0.5:1 to 1:0.5.

Electron-donor compounds ED not containing active hydrogen atoms are compounds which, under the preparation conditions of the catalyst components, are capable of forming addition compounds with the magnesium dihalides.

The use of these compounds as modifiers of catalysts comprising Ti compounds supported on magnesium dihalides is known in the literature.

Examples of these compounds are the alkyl, aryl, cycloalkyl esters of saturated or unsaturated aliphatic carboxylic acids and of aromatic carboxylic acids.

Particular compounds which furthermore fall within the preferred compounds are the esters of benzoic acid and derivatives thereof, such as e.g., ethyl benzoate, methyl and ethyl p-toluate, ethyl p-anisate, the esters of phthalic acid, such as e.g., the diethyl, di-n-butyl, di-n-octyl and di-isobutyl phthalates, the esters of maleic, fumaric, malonic, salicylic, pivalic, acrylic, carbonic, succinic acids, such as e.g., di-isobutylmaleate, di-2-ethylhexylmaleate, di-2-ethyl-hexylfumarate, diethyl-diisobutylmalonate, ethyl benzoylsalicylate, benzylpivalate and isobutylpivalate, n-propylpivalate, isobutylacrylate, diethylcarbonate, diisobutylsuccinate.

Other suitable compounds comprise ethers, ketones, lactones and electron-donor compounds containing atoms of N, P and/or S. Examples of these compounds are diisoamyl ether, diisobutyl ether, benzophenone, triphenyl-phosphite.

Composition (b) to be subjected to the treatment according to the present invention is obtainable according to various methods.

One of these methods, which is also a preferred method, consists in subjecting to co-pulverization a mixture consisting of magnesium dihalide, preferably magnesium chloride, of Ti halide and of ED compound, using a molar ratio ED compound/Ti halide ranging from 0.2 to 3 and preferably equal to 1 and a molar ratio ED compound/magnesium dihalide ranging from 0.05 to 0.3 and in particular from 0.07 to 0.15. Grinding is carried out under pulverization and duration conditions such as to reduce the average size of the magnesium dihalide crystallites to values lower than 300 Å and preferably to average values between 40 and 100 Å.

According to a variant of this method it is possible to pulverize the magnesium dihalide in the presence of only the ED compound or the Ti halide and then cause the compound not present during the grinding step to act in the course of, or after, the treatment with substance (c).

In the case of the Ti halide/Mg dihalide co-grinding there are employed molr ratios of Ti compound to Mg compound ranging from 0.01 to 0.4 and in particular from 0.05 to 0.2.

The mills used for grinding are of the conventional type; in particular they are vibrating, rotary and centrifugal mills.

The grinding conditions to obtain the cited decrease in the size of the magnesium dihalide crystallites are known to those skilled in the art.

The surface area of the product obtained from the co-grinding of the three components or of the magnesium dihalide in the presence of compound ED does not generally exceed 30–40 m$^2$/g.

Due to the treatment with substance (c), the surface area has a considerable increase. Increases of 10–20 times or more are possible, particularly when the surface area of product (b) is lower than 10 m$^2$/g. The increase in the surface area is not accompanied, however, by a decrease in the average size of the crystallites. Instead, an increase takes place, the value of which depends on the treatment conditions and on the starting average size.

In preparing the products (b) obtained by grinding, it is possible to subject to said treatment magnesium dihalides ground alone, in the absence of the Ti compound and of the ED compound. In such case, however, it is preferable to carry out the grinding in the presence of a grinding co-adjuvant selected, e.g., from among the silicon compounds containing one or more alkoxy or aryloxy groups, such as e.g., $Si(OC_2H_5)_4$, Si-vinyltriethoxy, Si-chlorotriethoxy, the halogenated aliphatic or aromatic hydrocarbons such as 1,2-dichloroethane, 1,2-dichlorobenzene, hexachloroethane and mixtures of the above-mentioned compounds.

The co-adjuvants are generally employed in weight ratios with magnesium dihalide ranging from 0.1 to 0.3.

Magnesium dihalide is then subjected to the treatment with substance (c) containing, dissolved therein, the Ti halide and the ED compound. The latter compounds may be supported on said Mg dihalide after the treatment with substance (c).

The magnesium dihalide of the starting composition (b), or the dihalide containing, supported on it, the Ti compound and/or ED compound, is obtainable, besides by grinding, also according to other methods. In any case, the Mg dihalide has a water content generally lower than 1% by weight; usually, the water content of the magnesium dihalides is comprised between 0.1 and 1% by weight.

All the methods known in the literature which lead to the formation of magnesium anhydrous dihalides, the X-rays powder spectrum of which shows a halo, in substitution of or in position corresponding to the most intense line which appears in the powder spectrum of the corresponding Mg dihalide having a surface area lower than 3 m$^2$/g, are suitable for the purpose.

Examples of these methods are:
reaction of a Grignard compound or of a MgR$_2$ compound (R=hydrocarbon radical) or complexes of said compounds with Al-trialkyls, with halogenating agents such as AlX$_3$ or AlR$_m$X$_n$ (X=halogen, R=hydrocarbon radical, m+n=3), SiCl$_4$ or HSiCl$_3$;
reaction of a Grignard compound with a silanol or a polysiloxane, H$_2$O, or an alcohol and further reaction with a halogenating agent or with TiCl$_4$;
reaction of Mg with an alcohol and a halogenhydric acid, or of Mg with a hydrocarbyl halide and an alcohol;
reaction of MgO with Cl$_2$ or AlCl$_3$;
reaction of MgX$_2$.nH$_2$O (X=halogen; n=1 to 6) with a halogenating agent or TiCl$_4$;
reaction of Mg mono- or di-alcoholates or Mg carboxylates with a halogenating agent.

When consistent with the reaction conditions leading to the formation of the magnesium dihalide, and especially when the electron-donor compound and/or the Ti compound do not react with the substances used to prepare the magnesium dihalide to give catalyst inactive products or products inhibiting the catalytic action, the reaction may be conducted by using liquid (c) as a reaction medium and by operating in the presence of compound ED and of the Ti halide, or said compounds can be supported after the treatment with substance (c). In particular, it is possible to use, as product (b), the product of the reaction between TiCl$_4$ and an adduct of MgCl$_2$ with an alcohol, which reaction has been carried out in the presence of an ED compound, and successive separation, for example by filtration of the reaction liquid phase. By successively treating the product containing the solid phase with liquid (c), a catalytic product according to the invention is obtained.

This method remarkably simplifies the methods known so far for preparing catalyst components from adducts of MgCl$_2$.alcohols, according to which methods it is necessary to treat the product of the reaction of the adduct with TiCl$_4$, with an excess of TiCl$_4$, to separate the excess of TiCl$_4$ and to successively carry out several washings of the solid.

Solid (b) may comprise, besides magnesium dihalide, known additives as solid co-carriers which are inert towards magnesium dihalide and towards the catalyst components, and/or Lewis acids.

Examples of co-carriers are silica and alumina; examples of the Lewis acids are AlCl$_3$, SbCl$_3$, ZnCl$_2$ and SnCl$_4$.

As already said, substance (c) has a dielectric constant at 20° C. equal to or higher than 2; it is inert to the compounds forming the catalyst components and it is liquid under the treatment conditions. It is selected in particular from the following classes of compounds. For some of those listed there is indicated the dielectric constant value at 20° C.:

aliphatic, cycloaliphatic or aromatic halogen hydrocarbons. Examples of these halogen hydrocarbons are: 1,2-dichloroethane (10.36), 1,2-dibromoethane, n-butylchloride (7.39), ethyl chloride and bromide, 1,1,2,2-tetrachloroethane (8.20), hexachloroethane, methylene chloride, methylene bromide,1,1,2-trichloroethylene (3.42), 1,1,2-tribromoethylene, 1,1-difluoro-1,2,2,2-tetrachloroethane, 1,2-difluoroethane, hexachlorocyclohexane, chlorobenzene (5.62), bromobenzene, 1,2-dichlorobenzene (9.93), phenyltrichloromethane, hexachlorobenzene;

aromatic hydrocarbons such as benzene (2.27), toluene (2.38), xylenes, styrene, tetrahydrohaphthalene (2.27), naphthalene;

aliphatic or cycloaliphatic hydrocarbons such as cyclohexane (2.02), decahydronaphthalene (2.15), 1-hexene (2.05), vaseline oil, waxes;

ethers such as diisobutyl ether, anisole, propylphenylether;

halogensilanes such as phenyltrichlorosilane (3.81), triphenylchlorosilane, hexachlorodisilane;

solutions in aliphatic hydrocarbons, such as hexane and heptane (in themselves not suitable for obtaining the results according to the invention), of the compounds mentioned hereinabove, provided the dielectric constant of the solution is equal to or higher than 2 at 20° C.

The extent of the effect of the treatment is not directly related to the dielectric constant value; it also depends on the chemical nature of the compound.

The most interesting results were attained with halogen hydrocarbons such as 1,2-dichloroethane, 1,1,2,2-tetrachloroethane, n-butylchloride, 1,1,2-trichloroethylene, chlorobenzene, 1,2-dichlorobenzene, with aromatic hydrocarbons such as toluene, o-xylene or mixtures of xylenes, and halogen-silanes such as triphenylchlorosilane.

The treatment with substance (c) is carried out under the conditions of temperature, duration and composition (b) concentration hereinafter specified until producing the already specified increase in the area and/or size of the crystallites.

Generally, it is preferable to operate at temperatures higher than 40°–50° C., but lower than 300°–350° C., ranging in particular from 60° to 150° C., for times ranging from ½ hour to 10 hours or more. Short times require generally higher temperatures. It is preferable to operate at the boiling temperature (at atmospheric pressure) of substance (c); to this purpose it is preferable to employ liquid having a boiling point between 60° and 150° C. Solid (b) is employed in amounts equal to weight ratios of magnesium dihalide to substance (c) ranging from 10:1 to 1:20 and preferably from 5:1 to 1:12. The use of substance (c) in amounts higher than in the above ratios does not provide advantageous effects; conversely, it may adversely affect the successive polymerization step, mainly when the product comprising the whole substance (c) utilized in the treatment is used as a catalyst component.

On the basis of the above directives, those skilled in the art will be in a position to chose the treatment conditions which will result in the desired effect.

Should product (b) be obtained by grinding, it is possible to carry out the treatment with substance (c) in the same mill in which composition (b) has been prepared, by adding substance (c) in such amounts that the product remains in the form of a free-flowing powder and continuing the grinding for relatively short times, e.g., 1–2 hours, while heating the liquid circulating in the jacket (temperatures generally ranging from 60° to 120° C.).

In such case, the treatment does not cause any meaningful increase in area; conversely, a considerable increase in the average size of the crystallites is obtained.

As already pointed out, a particular feature of the treatment according to the invention consists in that substance (c) and the by-products, if any, dissolved therein are not eliminated from the catalyst component; said substance (c), conversely, may be left in whole or in part in the catalyst component. If it is removed, the removal is carried out according to methods, such as evaporation, which do not remove the soluble by-products. For example, an azeotropic distillation with liquids forming azeotropes with said solution is carried out. In this case, components are obtained which lead to highly stereospecific and active catalysts, although substances are still present which so far have been considered to be detrimental to the activity and/or stereospecificity of the catalyst and absolutely to be removed.

The catalyst components of the invention form, by reaction with Al-alkyl compounds and with a further electron-donor compound (outside donor), catalysts which are highly active and stereospecific in the polymerization of alpha-olefins $CH_2=CHR$ ($R=$ an alkyl radical with 1–4 C or an aryl radical) and of mixtures thereof with minor amounts of ethylene.

The preferred catalysts comprise the product of the reaction between:
(A) catalyst components of the invention in which there is present in a supposed form on the magnesium dihalide an electron-donor compound ED extractable for at least 70% by moles with Al triethyl under the standard conditions described below, and in which the surface area of the solid after extraction with $AlEt_3$ is higher than 20 m²/g;
(B) an Al alkyl compound;
(C) an electron-donor compound reactive towards the $MgCl_2$, both which does not form complexes with Al triethyl when it is subjected to the measure standard test specified below.

Electron-donor compounds which satisfy the test indicated in (A) are described in Published European Patent Application No. 45976, No. 45977 and No. 86472.

Compounds satisfying the test specified in (C) are described in published European Patent Application No. 86472.

By citing the above applications it is understood than any part of the description therein which is relevant to the catalysts of the present invention, including the description of the tests carried out to determine the reactivities towards the Al triethyl and $MgCl_2$ and of the extractability test with Al triethyl, is incorporated herein.

For illustrative purpose, examples of representative compounds which are also preferred and which satisfy the test indicated in (A), are esters of maleic, fumaric, pivalic, methacrylic, succinic, malonic and phthalic acids, phenyl-phosphites, diisoamyl ether and diisobutyl ether, and benzophenone.

Specific compounds are diisobutylmaleate, di-2-ethylhexylmaleate, diethyldiisobutylmalonate, propylbenzyl- and isobutylpivalate, diisobutylsuccinate, diethylphthalate, di-n-butylphthalate, di-n-octyl-phthalate and diisobutyl-phthalate.

For illustrative purpose, representative compounds which satisfy the test indicated in (C) and which are also the preferred ones, are phenylalkoxysilanes such as phenyltriethoxy- and phenyltrimethoxysilane, diphenyl-dimethoxysilane and diphenyl-diethoxysilane; the alkyl-alkoxysilanes such as methyltriethoxysilane and ethyl-triisopropoxysilane; 2,2,6,6-tetramethylpiperidine, 2,2,5,5-tetramethylpyrrolidine, 2,2,6,6-tetramethylpiperidine-Al-diethyl, di(m-methylphenyl)amine, 2,2,6,6-tetramethyltetrahydro-4-pyrone.

The Al-alkyl compounds include Al trialkyls, such as e.g., $AlEt_3$, $Al(i-Bu)_3$, $Al(i-C_3H_7)_3$, $AlEt_2H$, and compounds containing two or more Al atoms linked to each other through hetero-atoms as oxygen, nitrogen or groups such as $SO_4$ or $SO_3$, as:

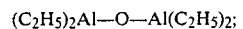

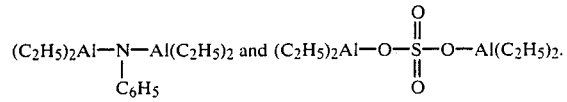

In the catalysts the molar ratio of compound (C) to the Al-alkyl compound is lower than 20 and preferably ranges from 0.05 to 1. Preferably, compound (C) is pre-contacted with the Al alkyl compound prior to the contact with the catalyst component of the invention. The reaction conditions are those already indicated in the above-cited applications.

The polymerization of the alpha-olefins and of the mixtures thereof with ethylene is carried out according to known methods operating in a liquid phase in the presence or in the absence of an inert hydrocarbon solvent or in a gas phase or combining, e.g., a polymerization step in the liquid phase with a polymerization step in the gas phase.

Generally, the temperature ranges from 40° to 160° C. preferably from 60° to 90° C., while operating at atmospheric pressure or at a higher pressure.

Hydrogen or other known molecular weight regulators can be employed as a molecular weight regulator.

As already pointed out, the catalysts are particularly suitable for polymerizing propylene, butene-1 and 4-methyl-pentene-1. They are also useful in preparing, according to known methods, ethylene-modified polypropylenes having improved characteristics of impact strength at low temperatures, or to obtain crystalline copolymers of propylene containing small amounts (2–10% by weight) of copolymerized ethylene.

The following examples are given to illustrate, but not to limit, the present invention. Unless otherwise specified, the percentages are expressed by weight; $T_{II}$ indicates the total isotacticity index of the polymer; $[\eta]$ indicates the inherent viscosity of the polymer (expressed in dl/g) measured in tetralin at 135° C.; the yield is expressed in Kg of polymer per g of solid catalyst component.

The data of D(110) in Å and the data relating to the surface area in $m^2/g$ for some examples are recorded in Table 8.

EXAMPLES

Polymerization of propylene

The standard polymerization test of propylene was carried out in a 2.5-liter autoclave equipped with a magnetic stirrer, thermoregulated by means of water circulating in a jacket and degassed in a dry nitrogen stream.

If the donor employed in the preparation of the catalyst component was diisobutylphthalate (DIBF), the process was the following: into a 250 cc separatory funnel equipped with a pressure equalizer and buffered with dry nitrogen, connected to a 250 cc tail flask, there were charged 80 cc of hexane, 5 m.moles of Al(Et)$_3$ and 0.25 m.moles of phenyltriethoxysilane (PES). After 5 minutes, 10 cc of such solution were discharged into the flask and mixed with 50 cc of hexane and a percentage of the solid catalyst component prepared as described in the examples.

After 3–4 minutes, the suspension together with the remaining portion of the solution was charged into the autoclave, which contained 850 cc of propylene-saturated hexane.

100N cc of $H_2$ were then fed, whereupon the polymerization conditions were rapidly attained by heating to 70° C. and raising the pressure inside the autoclave to 7 Kg/cm$^2$.

Propylene was further fed for 4 hours while keeping temperature and pressure constant; the monomer flow was then stopped, the autoclave was cooled and propylene was degassed. Finally, the polymeric suspension was filtered.

The polymer was dried in an oven at 70° C., was weighed and analyzed, while the solvent was evaporated and the residue was weighed.

When the inside donor was ethyl benzoate, the catalyst component was charged according to the same modalities as described, but using, instead of AlEt$_3$, 5.05 m.moles of Al triisobutyl and instead of phenyltriethoxysilane, 1.68 m.moles of ethyl p-methylbenzoate. The polymerization conditions were the following: temperature=60° C., pressure=7 Kg/cm$^2$, fed $H_2$=300N cc.

PREPARATION OF THE CO-MILLED PRODUCTS

EXAMPLE A1

6.5 g of anhydrous MgCl$_2$ (H$_2$O<1% by weight), 25.4 g of anhydrous diisobutylphthalate (DIBF) and 17.3 g of TiCl$_4$ were introduced, in a dry nitrogen atmosphere, into a cylindrical stainless steel container having an inside volume of 800 cc, equipped with an external jacket and containing 180 steel balls of 16 mm diameter. The container was then hermetically closed.

The molar ratio between MgCl$_2$ and DIBF was equal to 7.5 and the one between TiCl$_4$ and DIBF was equal to 1.

Grinding was carried out by a "Vibratom" mill manufactured by Siebtechnik, arranged for 1500 oscillations/minute with a total amplitude of 3.5 mm, onto which the container was positioned.

Thermoregulation was obtained by circulation of water in the jacket.

After 96 hours, the milled product was discharged in a dry nitrogen flow; successively the samples were drawn for the analytical determinations and for the polymerization test.

The characteristics and the performances of the product so obtained, as well as the characteristics and the performances of the products prepared according to examples A2–A7 are recorded in Table 1.

EXAMPLE A2

Example A1 was repeated, but employing the following molar ratios between the components: MgCl$_2$/DIBF=16 instead of 7.5; TiCl$_4$/DIBF=1.

EXAMPLE A3

According to the same modalities as are described in Example A1, MgCl$_2$ and DIBF with a molar ratio of 7.37 were charged into the container; it was ground at 20° C. for 48 hours, whereupon, always in a dry nitrogen atmosphere, TiCl$_4$ was introduced, so that the Ti/DIBF molar ratio obtained was 1. A second grinding step at 20° C. for more than 48 hours was effected, then the milled product was discharged and successively handled as in Example A1.

EXAMPLE A4

Operation was as in Example A1, but changing the grinding temperature: 60° C. instead of 20° C., and the grinding time of 48 hours instead of 96 hours.

EXAMPLE A5

Operation was as in Example A1 but the grinding time was 70 hours instead of 93 hours.

EXAMPLE A6

Example A1 was repeated, but using ethyl benzoate (EB) instead of DIBF.

EXAMPLES A7

Example A6 was repeated but using a MgCl$_2$/EB molar ratio of 5.

EXAMPLE A8

Example A1 was repeated, using only MgCl$_2$ and grinding for 48 hours. The data of Examples A7–A10 are reported in Table 2.

EXAMPLE A9

Operation was as in Example A1, using only MgCl$_2$ and DIBF with a MgCl$_2$/DIBF molar ratio of 7.5 and grinding time of 40 hours.

EXAMPLE A10

Example A1 was repeated, but cogrinding only MgCl$_2$ and TiCl$_4$ with a MgCl$_2$/TiCl$_4$ molar ratio of 12.3 and with a grinding time of 50 hours.

EXAMPLE A11

Example A1 was repeated, except that MgCl$_2$ and 1,2-dichloroethane (DCE) were co-ground with a molar ratio of 6.9 for 48 hours.

EXAMPLE 1

Following the modalities described in Example A1, 54.4 g of MgCl$_2$, 21.2 g of DIBF and 14.45 g of TiCl$_4$ were co-ground for 93 hours at 20° C. The container was then opened and 18 g of anhydrous 1,2-dichloroethane (in a dry nitrogen flow) were introduced. Grinding was continued (after closing of the container) for a further 2 hours, while heating to 80° C. by means of oil circulation in the jacket.

The vessel was cooled with water, and the powder was discharged, analyzed and tested in polymerization. The data of Examples 1-4 are reported in Table 2.

EXAMPLES 2-3

Operation was as in Example 1, but using xylene instead of DCE.

EXAMPLE 4

Following the procedure of Example A1, 54.4 g of MgCl$_2$, 14.5 g of TiCl$_4$ and 21.2 g of DIBF were co-ground at 20° C. for 88 hours. 27 g of CH$_2$Cl$_2$ were then introduced (in a N$_2$ flow), and the container was closed.

Grinding at 20° C. was carried out for a further 16 hours, then at 80° C. for 2 hours. After cooling down with water to 20° C., the powder was discharged.

EXAMPLE 1 (Comparative Test)

According to the modalities of Example A1, MgCl$_2$, DIBF and TiCl$_4$ were co-ground for 24 hours at 20° C., after which 1,2-dichloroethane was added to the powder according to a MgCl$_2$/DCE molar ratio = 3. Grinding was continued for a further 72 hours. The product was then discharged.

EXAMPLE 5

15 g of the solid co-ground in Example A1 together with 150 cc of anhydrous 1,2-dichloroethane were introduced into a 250 cc glass flask equipped with a stirrer, a cooler with water circulation, a thermometer, buffered with dry nitrogen and immersed in a thermostatic oil bath. The suspension was heated under stirring for 2 hours at reflux temperature (83.5° C.), whereupon it was cooled to room temperature.

Under stirring and in a nitrogen flow, a suspension sample to be used as such for the polymerization test was drawn.

The data relevant to Examples 5-13 are recorded in Table 3.

EXAMPLE 6

18.4 g of powder prepared as described in A1, and then 3.68 g of 1,2-dichloroethane under slight stirring were introduced, while slowly operating to avoid the formation of crumbs, into a 100 cc glass flask equipped with a stirrer, a thermometer, buffered with dry nitrogen and immersed in a thermostatic oil bath.

It was heated to 85° C., stirring being continued for 2 hours. It was cooled down to room temperature and a powder sample was drawn, which was used as such in the standard polymerization test.

EXAMPLES 7-13

Operation was as in Example 5, except for the variations in the treatment conditions and in the reagents, as indicated in Table 3.

EXAMPLE 2 (Comparative Test)

It was operated as in Example 13, using n-heptane instead of toluene. The data are recorded in Table 3.

EXAMPLES 14-24

It was operated as in Example 6, except for the variations in the operating conditions and in the reagents as indicated in Table 4.

EXAMPLES 25-27

It was operated as in Example 5, except for the variations in the operating conditions and in the reagents as indicated in Table 4.

EXAMPLE 28

32 g of the co-ground solid prepared in A1, 54 cc of anhydrous n-heptane and 9.7 cc of anhydrous 1,2-dichloroethane were charged, in a dry N$_2$ flow, into the glass flask of the equipment described in Example 5; it was heated for 2 hours to 84° C., then it was cooled down and a suspension sample was drawn as in Example 5.

EXAMPLES 29-34

It was operated as described in Example 28, varying the reagents and the amounts charged, as is indicated in Table 3 and specified in more detail in the following scheme.

| Ex. No. | Amount of co-ground product (g) | Activator | Amount of activator | Diluent | Amount of diluent (cc) |
|---|---|---|---|---|---|
| 29 | 30.3 | DCE | 21.2 cc | n-heptane | 40 |
| 30 | 33.4 | toluene | 8.2 cc | " | 58.3 |
| 31 | 28 | " | 38.7 cc | " | 17.4 |
| 32 | 21 | styrene | 42 cc | " | 100 |
| 33 | 20 | naphalene | 12 g | " | 28 |
| 34 | 28 | triphenylsilane | 12.35 g | " | 58 |

EXAMPLES 35-38

The reagents in the amounts specified below were charged into a flask as in Example 5. The suspension was stirred for 2 hours at 85.5° C., after which operation was as in Example 5.

| Ex. No. | Component A | Amount of component A (g) | Liquid activator | Amount of activator (cc) | TiCl$_4$ (g) | DIBF (g) |
|---|---|---|---|---|---|---|
| 35 | A8 | 5.2 | Cl–C$_6$H$_4$–Cl | 6.4 | 1.3 | 1.9 |
| 36 | A9 | 20.1 | DCE | 48. | 3.76 | — |
| 37 | A9 | 38.6 | " | 108.26 | 14.53 | — |
| 38 | A10 | 22.9 | " | 46. | — | 4.68 |

The data of Examples 35-38 are recorded in Table 6.

EXAMPLE 39

48 g of co-ground product A1 together with 480 cc of DCE were introduced into a 250 cc glass flask equipped with a stirrer, a ball cooler with water circulation, a thermometer, buffered with dry nitrogen and immersed in a thermostatic oil bath.

The suspension was heated to 83.5° C. for 2 hours under stirring, then it was cooled to room temperature and the cooler was replaced by a Liebig condenser connected with a small distillate collection flask.

100 cc of anhydrous n-heptane ($H_2O<10$ ppm) were added and it was distilled until the catalyst suspension was transformed into a thick slurry. Lots of 100 cc each of n-heptane were successively added and distillations of the liquid were repeated until reaching a temperature of the vapors evolving from the flask of about 98° C.

The residual liquid was eliminated by distillation, until obtaining the catalyst in the form of free-flowing particles; finally it was diluted with 200 cc of n-heptane. The chemical analysis on the catalyst was carried out under drying under vacuum at 50° C. for 1 hour with a residual pressure of 60 mm Hg, while the polymerization test was carried out with the heptane suspension.

The data relating to Examples 39–50 are recorded in Table 7.

EXAMPLE 40

Example 39 was repeated, except that the DCE/co-ground product weight ratio was 2.5 (500 g/l).

EXAMPLE 41

Example 39 was repeated, but instead of DCE there was used, as an activator, a mixture of liquid consisting of 64% by weight of DCE and 36% by weight of n-heptane.

EXAMPLE 42

Example 39 was repeated, but with a DCE/co-ground product weight ratio equal to 2.5; furthermore, the separation of DCE from the solid was carried out, after the activation, by distilling such solvent in the absence of heptane till reducing the starting amount thereof by 50%.

The polymerization test was carried out on a sample of the final suspension after dilution with 100 cc of heptane.

EXAMPLE 43

Operation was as in Example 39, but the separation of DCE was carried out by distilling the liquid in the absence of n-heptane until obtaining free-flowing particles.

EXAMPLE 44

The procedure was as in Example 42, but the separation of DCE was effected as follows: 50% of the starting liquid was distilled in the absence of n-heptane, then it was diluted with n-heptane (100 cc) and the liquid was distilled almost completely.

Successive dilutions and distillations were repeated until the temperature of the vapors in the equipment head was 98° C.; it was diluted again with n-heptane as in Example 39, and a suspension sample was drawn to carry out a polymerization test.

EXAMPLES 45–46

Operation was as in Example 40, but using different activators instead of DCE.

EXAMPLE 47

Example 40 was repeated, but substituting DCE by $CH_2Cl_2$; the activation temperature was 40° C. and the activator/solid weight ratio was 5.3.

EXAMPLE 48

Operation was as in Example 39, but using co-ground product A3 instead of A1.

EXAMPLE 49

The procedure was as in Example 39, but using co-ground product A6 instead of A1 and employing a DCE/co-ground product weight ratio of 2.5; furthermore, the separation of DCE from the solid was accomplished as in Example 42.

EXAMPLE 50

Operation was as in Example 39, but employing co-ground product A6 instead of A1 and with a DCE/co-ground product weight ratio of 2.5. The separation of DCE was accomplished as in Example 44.

EXAMPLE 51

Using the same equipment and following the same procedure as in Example A1, 85.7 g of anhydrous $MgCl_2$ and 143 g of anhydrous vinyltriethoxysilane (product A12) were co-ground for 90 hours at room temperature. The powder was analyzed: $D(110)=47$ Å; surface area = 32 $m^2/g$.

6.8 g of the solid were treated as in Example 5 with 85 cc of anhydrous DCE containing 1.45 g of $TiCl_4$ and 1.07 g of DIBF for a time of 10 hours at 80° C.

A sample was drawn for analysis (the solid was separated from DCE by filtration at room temperature and was successively washed, always at room temperature, with n-heptane until disappearance of the chlorine ions, then it was dried at 40° C. under a vacuum of 60 Torr). The analysis gave the following results: $D(110)=75$ Å; surface area = 121 $m^2/g$.

A suspension sample drawn as indicated in Example 5 gave the following results in the polymerization test: Yield = 6 Kg/g; $T_{II}=95$; $[\eta]=1.62$ dl/g.

EXAMPLE 52

Example 51 was repeated, with the exception that the co-ground product A12 was treated at 84° C. for 10 hours only with DCE (85 cc). It was cooled down and the DCE in excess was removed by means of a syphon.

A sample drawn for analysis was repeatedly washed with n-heptane at room temperature until disappearance of the chlorine ions from the reaction.

The results obtained from the analysis were: $D(110)=90$ Å; surface area = 243 $m^2/g$.

To the product, from which DCE was separated by syphoning, there were added 85 cc of n-heptane containing in the dissolved form 1.45 g of $TiCl_4$ and 1.07 g of DIBF. The mass was heated for 2 hours to 98° C. under stirring, then cooled. A sample was drawn for analysis and a further sample for the polymerization test. The results of the analysis were: $D(110)=85$ Å; surface area = 90 $m^2/g$. The polymerization data were: yield = 5.1 Kg/g; $T_{II}=91$.

TABLE 1

| Ex. No. | PREPARATION COMPONENTS | Mol. ratio Mg/DIBF | Mol. ratio Ti/DIBF | Time (h) | Temp. (°C.) | CATALYST COMPONENT Ti (%) | Mg (%) | Cl (%) | DIBF (%) | POLYMERIZATION Mg (ppm) | $T_{II}$ | $[\eta]$ (dl/g) | Yield (Kg/g) |
|---|---|---|---|---|---|---|---|---|---|---|---|---|---|
| A1 | MgCl$_2$ + DIBF + TiCl$_4$ | 7.5 | 1 | 96 | 20 | 4.29 | 16.89 | 56.13 | 19.65 | 66 | 85.7 | 1.71 | 2.5 |
| A2 | MgCl$_2$ + DIBF + TiCl$_4$ | 16.0 | 1 | 96 | 20 | 2.15 | 20.30 | 64. | 9.90 | 114 | 78.1 | — | 1.5 |
| A3 | (1st step) MgCl$_2$ + DIBF | 7.5 | — | 48 | 20 | 4.25 | 15.55 | 56.20 | 18.70 | 65 | 78. | 2.2 | 2.4 |
|  | (2nd step) TiCl$_4$ | — | 1 | 48 | 20 |  |  |  |  |  |  |  |  |
| A4 | MgCl$_2$ + DIBF + TiCl$_4$ | 7.5 | 1 | 48 | 60 | 4.30 | 14.55 | 55.40 | 22.40 | 85 | 85.2 | 1.60 | 1.6 |
| A5 | MgCl$_2$ + DIBF + TiCl$_4$ | 7.5 | 1 | 70 | 30 | 3.65 | 18.00 | 58.75 | 20.8 | 86 | 80. | — | 2.15 |

| Ex. No. | PREPARATION COMPONENTS | Mol. ratio Mg/EB | Mol. ratio Ti/EB | Time (h) | Temp. (°C.) | CATALYST COMPONENT Ti (%) | Mg (%) | Cl (%) | EB (%) | POLYMERIZATION Mg (ppm) | $T_{II}$ | $[\eta]$ (dl/g) | Yield (Kg/g) |
|---|---|---|---|---|---|---|---|---|---|---|---|---|---|
| A6 | MgCl$_2$ + EB + TiCl$_4$ | 7.5 | 1 | 96 | 20 | 3.55 | 18.55 | 63.90 | 9.3 | 280 | 77.1 | 1.38 | 0.6 |
| A7 | MgCl$_2$ + EB + TiCl$_4$ | 5. | 1 | 96 | 20 | 5.70 | 14.15 | 60.20 | 17.4 | 109 | 82.3 | 1.70 | 1.3 |

TABLE 2

| Ex. No. | PREPARATION COMPONENTS | Mol. ratio Mg/Ti | Mol. ratio Mg/DIBF | Time (h) | Temp. (°C.) | CATALYST COMPONENT Ti (%) | Mg (%) | Cl (%) | DIBF (%) | POLYMERIZATION Mg (ppm) | $T_{II}$ | $[\eta]$ (dl/g) | Yield (Kg/g) |
|---|---|---|---|---|---|---|---|---|---|---|---|---|---|
| A8 | MgCl$_2$ | — | — | 48 | 20 | — | — | — | — | — | — | — | — |
| A9 | MgCl$_2$ + DIBF | — | 7.5 | 40 | 20 | — | 18. | 51.9 | 21.3 | — | — | — | — |
| A10 | MgCl$_2$ + TiCl$_4$ | 12.3 | — | 50 | 20 | 3.5 | 21.96 | — | — | 54 | 72 | 1.52 | 4.2 |
| A11 | MgCl$_2$ + 1,2-dichloroethane | — | — | 48 | 20 | — | 22.2 | — | — | — | — | — | — |
| 1 | (1st step) MgCl$_2$ + DIBF + TiCl$_4$ | 7.5 | 7.5 | 93 | 20 | — | — | — | — | — | — | — | — |
|  | (2nd step) DCE | — | — | 2 | 80 | 3.85 | 16.6 | 49.5 | 18.9 | 27 | 93 | 1.87 | 6.1 |
| 2 | (1st step) MgCl$_2$ + DIBF + TiCl$_4$ | 7.5 | 7.5 | 93 | 20 | — | — | — | — | — | — | — | — |
|  | (2nd step) xylene | — | — | 2 | 80 | 3.69 | 15.26 | 51.6 | 17.65 | 24 | 94.6 | 1.72 | 6.3 |
| 3 | (1st step) MgCl$_2$ + DIBF + TiCl$_4$ | 7.5 | 7.5 | 93 | 20 | — | — | — | — | — | — | — | — |
|  | (2nd step) xylene | — | — | 3 | 80 | 3.67 | 16.57 | 56.8 | 17.20 | 24 | 93.5 | 2.12 | 5.7 |
| 4 | (1st step) MgCl$_2$ + DIBF + TiCl$_4$ | 7.5 | 7.5 | 88 | 20 | — | — | — | — | — | — | — | — |
|  | (2nd step) CH$_2$Cl$_2$ | — | — | 4 | 80 | 4.05 | 13.92 | — | — | 37 | 91.2 | 2.0 | 3.8 |
| 1 (Comparative) | (1st step) MgCl$_2$ + DIBF + TiCl$_4$ | 7.5 | 7.5 | 24 | 20 | — | — | — | — | — | — | — | — |
|  | (2nd step) DCE | — | — | 72 | 20 | 3.70 | 13.40 | 49.05 | 18.1 | 75 | 88 | — | 1.8 |

TABLE 3

| Ex. No. | COMPONENT A (Co-ground) | Ti (%) | Mg (%) | DIBF (%) | POLYMERIZATION OF CO-GROUND PRODUCT Yield (Kg/g) | Mg (ppm) | $T_{II}$ | $[\eta]$ (dl/g) |
|---|---|---|---|---|---|---|---|---|
| 5 | A1 | 4.29 | 16.89 | 19.65 | 2.5 | 66 | 85.7 | 1.71 |
| 6 | A1 | 4.29 | 16.89 | 19.65 | 2.5 | 66 | 85.7 | 1.71 |
| 7 | A1 | 4.29 | 16.89 | 19.65 | 2.5 | 66 | 85.7 | 1.71 |
| 8 | A1 | 4.29 | 16.89 | 19.65 | 2.5 | 66 | 85.7 | 1.71 |
| 9 | A1 | 4.29 | 16.89 | 19.65 | 2.5 | 66 | 85.7 | 1.71 |
| 10 | A1 | 4.29 | 16.89 | 19.65 | 2.5 | 66 | 85.7 | 1.71 |
| 11 | A1 | 4.29 | 16.89 | 19.65 | 2.5 | 66 | 85.7 | 1.71 |
| 12 | A1 | 4.29 | 16.89 | 19.65 | 2.5 | 66 | 85.7 | 1.71 |
| 13 | A1 | 4.29 | 16.89 | 19.65 | 2.5 | 66 | 85.7 | 1.71 |
| 2 Comparative | A1 | 4.29 | 16.89 | 19.65 | 2.5 | 66 | 85.7 | 1.71 |

| Ex. No. | TREATMENT CONDITIONS Activator | Temp. (°C.) | Time (h) | Weight Ratio Activator/Component A | POLYMERIZATION Yield (kg/g) | Mg (ppm) | $T_{II}$ | $[\eta]$ (dl/g) |
|---|---|---|---|---|---|---|---|---|
| 5 | 1,2-dichloroethane | 83.5 | 2 | 12.5 | 5.8 | 29 | 96.5 | 2.40 |
| 6 | 1,2-dichloroethane | 83.5 | 2 | 0.2 | 7.7 | 22 | 94.6 | 2.15 |
| 7 | 1-chlorobutane | 85 | 2 | 1.76 | 9.4 | 18 | 95. | 1.97 |
| 8 | CHCl=CCl$_2$ | 84 | 2 | 2.9 | 7.0 | 24 | 93.7 | 2.05 |
| 9 | cyclohexane | 81 | 2 | 1.6 | 4.6 | 37 | 90.7 | 1.50 |
| 10 | decahydronaphthalene | 84 | 2 | 1.76 | 2.1 | 80 | 89. | 1.35 |
| 11 | 1-hexene | 64 | 2 | 1.34 | 4.7 | 36 | 87.6 | 1.79 |
| 12 | benzene | 80 | 2 | 1.75 | 8.9 | 19 | 94.8 | 1.80 |
| 13 | toluene | 84 | 2 | 3.3 | 7.7 | 22 | 97.5 | 1.85 |

TABLE 3-continued

| | | | | | | | |
|---|---|---|---|---|---|---|---|
| 2 Comparative | | 85 | 2 | 3.3 | 2.7 | 65 | 86. | 1.7 |

TABLE 4

| | COMPONENT A | | | | POLYMERIZATION OF CO-GROUND PRODUCT | | | |
|---|---|---|---|---|---|---|---|---|
| Ex. No. | Component A (Co-ground) | Ti (%) | Mg (%) | DIBF (%) | Yield (Kg/g) | Mg (ppm) | $T_{II}$ | $[\eta]$ (dl/g) |
| 14 | A1 | 4.29 | 16.89 | 19.65 | 2.5 | 66 | 85.7 | 1.71 |
| 15 | A1 | 4.29 | 16.89 | 19.65 | 2.5 | 66 | 85.7 | 1.71 |
| 16 | A1 | 4.29 | 16.89 | 19.65 | 2.5 | 66 | 85.7 | 1.71 |
| 17 | A1 | 4.29 | 16.89 | 19.65 | 2.5 | 66 | 85.7 | 1.71 |
| 18 | A1 | 4.29 | 16.89 | 19.65 | 2.5 | 66 | 85.7 | 1.71 |
| 19 | A1 | 4.29 | 16.89 | 19.65 | 2.5 | 66 | 85.7 | 1.71 |
| 20 | A1 | 4.29 | 16.89 | 19.65 | 2.5 | 66 | 85.7 | 1.71 |
| 21 | A1 | 4.29 | 16.89 | 19.65 | 2.5 | 66 | 85.7 | 1.71 |
| 22 | A2 | 2.15 | 20.30 | 9.9 | 1.5 | 114 | 78.1 | |
| 23 | A4 | 4.30 | 14.55 | 22.40 | 1.6 | 85 | 85.2 | |
| 24 | A5 | 3.65 | 18. | 20.8 | 2.15 | 86 | 80. | |
| 25 | A6 | 3.55 | 18.55 | 9.3 | 0.6 | 280 | 77.1 | 1.38 |
| 26 | A7 | 5.70 | 14.15 | 17.4 | 1.3 | 109 | 82.3 | 1.30 |
| 27 | A7 | 5.70 | 14.15 | 17.4 | 1.3 | 109 | 82.3 | 1.30 |

| | TREATMENT CONDITIONS | | | | POLYMERIZATION | | | |
|---|---|---|---|---|---|---|---|---|
| Ex. No. | Activator | Temp. (°C.) | Time (h) | Weight Ratio Activator/ Component A | Yield (Kg/g) | Mg (ppm) | $T_{II}$ | $[\eta]$ (dl/g) |
| 14 | xylene | 85 | 2 | 0.20 | 7.6 | 26 | 94.1 | 2.20 |
| 15 | tetrahydro-naphthalene | 84 | 2 | 1.9 | 3.8 | 44 | 93. | 1.70 |
| 16 | C₆H₅—Cl | 84 | 2 | 2.2 | 6.8 | 25 | 96.5 | 2.28 |
| 17 | C₆H₄Cl₂ (ortho) | 84 | 2 | 2.6 | 6.8 | 25 | 96.5 | 1.80 |
| 18 | C₆H₅—SiCl₃ | 84 | 2 | 2.6 | 9.9 | 17 | 97. | 2.20 |
| 19 | SiCl₄ | 58 | 2 | 2.96 | 4.0 | 42 | 83. | 2.15 |
| 20 | CH₃SiHCl₂ | 39 | 2 | 2.21 | 5.2 | 33 | 88.9 | 1.75 |
| 21 | C₆H₅—OCH₃ | 85 | 2 | 0.2 | 5.1 | 33 | 90. | 2.07 |
| 22 | 1,2-dichloro-ethane | 83.5 | 2 | 2.5 | 4.2 | 48 | 87.3 | 1.54 |
| 23 | 1,2-dichloro-ethane | 83.5 | 2 | 2.5 | 5.6 | 26 | 96.3 | 1.53 |
| 24 | tetrahydro-naphthalene | 100. | 2 | 0.39 | 4.9 | 37 | 96.8 | 1.72 |
| 25 | 1,2-dichloro-ethane | 83.5 | 2 | 2.5 | 4.8 | 39 | 83.8 | 1.82 |
| 26 | 1,2-dichloro-ethane | 83.5 | 2 | 2.5 | 4.0 | 35 | 90.9 | 2.26 |
| 27 | toluene | 84 | 2 | 1.72 | 3.1 | 46 | 88.3 | 1.85 |

TABLE 5

| | COMPONENT A | | | | POLYMERIZATION OF CO-GROUND PRODUCT | | | |
|---|---|---|---|---|---|---|---|---|
| Ex. No. | Component A (Co-ground) | Ti (%) | Mg (%) | DIBF (%) | Yield (Kg/g) | Mg (ppm) | $T_{II}$ | $[\eta]$ (dl/g) |
| 28 | A1 | 4.29 | 16.89 | 19.65 | 2.5 | 66 | 85.7 | 1.71 |
| 29 | A1 | 4.29 | 16.89 | 19.65 | 2.5 | 66 | 85.7 | 1.71 |
| 30 | A1 | 4.29 | 16.89 | 19.65 | 2.5 | 66 | 85.7 | 1.71 |
| 31 | A1 | 4.29 | 16.89 | 19.65 | 2.5 | 66 | 85.7 | 1.71 |
| 32 | A1 | 4.29 | 16.89 | 19.65 | 2.5 | 66 | 85.7 | 1.71 |
| 33 | A1 | 4.29 | 16.89 | 19.65 | 2.5 | 66 | 85.7 | 1.71 |
| 34 | A1 | 4.29 | 16.89 | 19.65 | 2.5 | 66 | 85.7 | 1.71 |

TABLE 5-continued

| | TREATMENT CONDITIONS | | | Co-ground concentration g/l mixture | POLYMERIZATION | | | |
|---|---|---|---|---|---|---|---|---|
| | Activator | | | | | | | |
| Ex. No. | Activator | Molar fraction | Temp. (°C.) | Time (h) | | Yield (Kg/g) | Mg (ppm) | $T_{II}$ | $[\eta]$ (dl/g) |
| 28 | 1,2-dichloroethane | 1/4 | 84 | 2 | 500 | 5.0 | 34 | 92.9 | 1.79 |
| 29 | 1,2-dichloroethane | 1/2 | 84 | 2 | 500 | 7.7 | 22 | 95.5 | 1.86 |
| 30 | toluene | 1/6 | 84 | 2 | 500 | 3.3 | 51 | 89. | 1.37 |
| 31 | toluene | 3/4 | 84 | 2 | 500 | 4.2 | 40 | 95.6 | 2.16 |
| 32 | styrene | 0.35 | 84 | 2 | 150 | 5.8 | 29 | 96.4 | 1.53 |
| 33 | styrene | 1/10 | 84 | 2 | 150 | 4.1 | 41 | 95.2 | 1.62 |
| 34 | triphenylsilane | 1/10 | 85 | 2 | 500 | 3.8 | 45 | 88.3 | 1.41 |

TABLE 6

| | COMPONENT A | | | | POLYMERIZATION OF CO-GROUND PRODUCT | | | |
|---|---|---|---|---|---|---|---|---|
| Ex. No. | Component A (Co-ground) | Ti (%) | Mg (%) | DIBF (%) | Yield (Kg/g) | Mg (ppm) | $T_{II}$ | $[\eta]$ (dl/g) |
| 35 | A8 | — | — | — | — | — | — | — |
| 36 | A9 | — | 18 | 21.3 | — | — | — | — |
| 37 | A9 | — | 18 | 21.3 | — | — | — | — |
| 38 | A10 | 3.5 | 22 | — | 4.2 | 54 | 72 | 1.52 |

| | TREATMENT CONDITIONS | | | | | | POLYMERIZATION | | | |
|---|---|---|---|---|---|---|---|---|---|---|
| Ex. No. | Activator | Catalyst component | Catalyst component concentration (g/l mixture) | Co-ground concentration (g/l mixture) | Temp. (°C.) | Time (h) | Yield (Kg/g) | Mg (ppm) | $T_{II}$ | $[\eta]$ (dl/g) |
| 35 | Cl-C6H4-Cl | Co-ground TiCl4—DIBF | 500 | 800 | 120 | 6 | 1.7 | 93 | 90.4 | 1.58 |
| 36 | DCE | TiCl4 | 78 | 400 | 83.5 | 4 | 2.3 | 65 | 93.0 | 1.20 |
| 37 | DCE | TiCl4 | 135 | 350 | 83.5 | 4 | 3.5 | 37 | 88.3 | 1.55 |
| 38 | DCE | DIBF | 100 | 500 | 83.5 | 4 | 3.3 | 55 | 91.8 | 1.34 |

TABLE 7

| | COMPONENT A | | | | POLYMERIZATION OF COMPONENT A | | | |
|---|---|---|---|---|---|---|---|---|
| Ex. No. | Component A (Co-ground) | Ti (%) | Mg (%) | DIBF (%) | Yield (Kg/g) | Mg (ppm) | $T_{II}$ | $[\eta]$ (dl/g) |
| 39 | A1 | 4.29 | 16.89 | 19.65 | 2.5 | 66 | 85.7 | 1.71 |
| 40 | A1 | 4.29 | 16.89 | 19.65 | 2.5 | 66 | 85.7 | 1.71 |
| 41 | A1 | 4.29 | 16.89 | 19.65 | 2.5 | 66 | 85.7 | 1.71 |
| 42 | A1 | 4.29 | 16.89 | 19.65 | 2.5 | 66 | 85.7 | 1.71 |
| 43 | A1 | 4.29 | 16.89 | 19.65 | 2.5 | 66 | 85.7 | 1.71 |
| 44 | A1 | 4.29 | 16.89 | 19.65 | 2.5 | 66 | 85.7 | 1.71 |
| 45 | A1 | 4.29 | 16.89 | 19.65 | 2.5 | 66 | 85.7 | 1.71 |
| 46 | A1 | 4.29 | 16.89 | 19.65 | 2.5 | 66 | 85.7 | 1.71 |
| 47 | A1 | 4.29 | 16.89 | 19.65 | 2.5 | 66 | 85.7 | 1.71 |
| 48 | A3 | 4.25 | 15.55 | 18.70 | 2.4 | 65 | 78. | 2.2 |
| 49 | A6 | 3.55 | 18.55 | 9.3 | 0.6 | 280 | 77.1 | 1.38 |
| 50 | A6 | 3.55 | 18.55 | 9.3 | 0.6 | 280 | 77.1 | 1.38 |

| | TREATMENT CONDITIONS | | | Weight Ratio | | POLYMERIZATION | | | |
|---|---|---|---|---|---|---|---|---|---|
| Ex. No. | Activator | Temp. (°C.) | Time (h) | Activator/component | solvent | Yield (Kg/g) | Mg (ppm) | $T_{II}$ | $[\eta]$ (dl/g) |
| 39 | DCE | 83.5 | 2 | 12.5 | n-heptane | 10 | 16 | 97 | 2.1 |
| 40 | DCE | 83.5 | 2 | 2.5 | n-heptane | 8 | 19 | 96.5 | 1.6 |
| 41 | DCE 64% n-heptane 36% | 83.5 | 2 | 12.5 | n-heptane | 7 | 25 | 96 | 2.6 |
| 42 | DCE | 83.5 | 2 | 2.5 | — | 10.6 | 16 | 97.5 | 2.1 |
| 43 | DCE | 83.5 | 2 | 12.5 | — | 6.5 | 21 | 95.2 | 1.7 |
| 44 | DCE | 83.5 | 2 | 2.5 | n-heptane | 11.3 | 15 | 97.5 | 2.16 |

TABLE 7-continued

| | | | | | | | | | |
|---|---|---|---|---|---|---|---|---|---|
| 45 |  | 85 | 2 | 2.6 | n-heptane | 10.3 | 16 | 97.1 | 1.6 |
| 46 | xylene | 85 | 2 | 8.8 | n-heptane | 3.4 | 47 | 94.7 | 1.17 |
| 47 | $CH_2Cl_2$ | 40 | 2 | 5.3 | n-heptane | 7.3 | 21 | 93 | 1.9 |
| 48 | DCE | 83.5 | 2 | 12.5 | n-heptane | 8.9 | 20 | 97.4 | 2.2 |
| 49 | DCE | 83.5 | 2 | 2.5 | n-heptane | 6 | 31 | 86 | 1.87 |
| 50 | DCE | 83.5 | 2 | 2.5 | n-heptane | 6.6 | 35 | 84.4 | 1.77 |

TABLE 8

| Example | Surface area (m²/g) | D(110) Å |
|---|---|---|
| A1 | 5.6 | 42 |
| A2 | — | 47 |
| A3 | — | 47 |
| A4 | — | 80 |
| A5 | — | 47 |
| A6 | 19.8 | 47 |
| A7 | — | 42 |
| A8 | 43.5 | 150 |
| A9 | <1 | 60 |
| A10 | 50 | 107 |
| A11 | 123 | 90 |
| 1 | 10.15 | 70 |
| 2 | — | 90 |
| 3 | — | 65 |
| 4 | — | 100 |
| 1 Comparative | (1st) 7. (2nd) 14.5 | 70 60 |
| 5 | 255 | 49 |
| 6 | 5 | 65 |
| 7 | 22 | 55 |
| 8 | — | 60 |
| 9 | 108 | 55 |
| 10 | — | 42 |
| 11 | 19.5 | 42 |
| 12 | 45 | 42 |
| 13 | 229 | 52 |
| 2 Comparative | 12 | 40 |
| 14 | — | 57 |
| 15 | 85 | 52 |
| 16 | — | 55 |
| 17 | — | 85 |
| 18 | — | 65 |
| 19 | — | 60 |
| 20 | 30 | 40 |
| 21 | 130 | 85 |
| 22 | — | 55 |
| 23 | — | 77 |
| 25 | — | 50 |
| 26 | — | 57 |
| 28 | 25 | 47 |
| 29 | 27 | 52 |
| 30 | 42 | 47 |
| 31 | 41 | 57 |
| 32 | 57 | 135 |
| 33 | — | 100 |
| 35 | — | 107 |
| 36 | — | 77 |
| 37 | — | 65 |
| 38 | 168 | 60 |
| 40 | 133 | 75 |
| 41 | 163 | 57 |
| 43 | 70 | 62 |
| 44 | 84.5 | 77 |
| 45 | — | 77 |
| 46 | 91 | 47 |
| 47 | 21 | 55 |
| 48 | 30 | 60 |
| 49 | — | 65 |
| 50 | 188 | 65 |

What is claimed is:

1. Components of catalysts for polymerizing alpha-olefins $CH_2=CHR$, in which R is a $C_1-C_4$ alkyl radical or an aryl radical, and mixtures thereof with minor amounts of ethylene, said components comprising a solid (a) containing a titanium halide and an electron-donor compound (ED) not containing active hydrogen atoms supported on an anhydrous magnesium dihalide the crystallites of which have an average size less than 300 Å, the ED compound/titanium halide in solid (a) molar ratio being from 0.2 to 3 and the ED compound/magnesium dihalide molar ratio being from 0.05 to 0.3; solid (a) or a composition containing solid (a) being obtained by a treatment with a substance (c), at temperatures higher than 40° C. and lower than 350° C. for a time ranging from one-half hour to ten hours or longer, on a composition (b) comprising an anhydrous magnesium dihalide the crystallites of which have an average size less than 300 Å or comprising said magnesium dihalide containing, supported thereon, a titanium halide and/or an ED compound, until the surface area of (b) is increased by at least 3 times without a reduction in the average size of the magnesium dihalide crystallites, or until the average size of the crystallites of the magnesium dihalide present in (b) is increased by at least 5% without a reduction in the surface area of (b), substance (c) being liquid under the treatment conditions, inert to the compounds forming the catalyst components and having a dielectric constant at 20° C. equal to or higher than 2 and being employed in an amount exceeding 10% by weight in respect with the magnesium halide and being left, at the end of the treatment, fully or partially in contact with solid (a) or, if removed, being removed by evaporation; the titanium halide and/or the ED compound being supported on the magnesium dihalide during or after the treatment with substance (c) at least when said compounds are not already supported on the magnesium dihalide.

2. Catalyst components according to claim 1, in which the treatment with substance (c) is carried out on composition (b) obtained by co-grinding a mixture comprising the magnesium dihalide, the titanium halide and the ED compound.

3. Catalyst components according to claim 1, in which composition (b) comprises the magnesium dihalide, either the titanium halide or the ED compound and in which either the titanium halide or ED compound not present in composition (b) is supported on the magnesium dihalide during or after the treatment with substance (c).

4. Catalyst components according to claim 1, in which composition (b) comprises the magnesium dihalide but neither the ED compound nor the Ti halide, and is treated with substance (c) in the presence of the titanium halide and of the ED compound, or said compounds are supported on the magnesium dihalide after treatment with substance (c).

5. Catalyst components according to claim 1, in which substance (c) is selected from the group consisting of aliphatic, cycloaliphatic and aromatic halogenated hydrocarbons, aromatic hydrocarbons and halogen-silanes.

6. Catalyst components according to claim 5, in which substance (c) is selected from the group consisting of 1,2-dichloroethane, 1,1,2,2-tetrachloroethane, 1,1,2-trichloroethylene, chlorobenzene, 1,2-dichlorobenzene, benzene, toluene and xylene.

7. Catalyst components according to claim 1, in which substance (c) is a liquid having a boiling point, at atmospheric pressure, of from 60° C. to 150° C., and the treatment with said liquid is performed under reflux conditions.

8. Catalyst components according to claim 1, in which the weight ratio of substance (c) to the magnesium dihalide of compositions (b) is from 0.1 to 20.

9. Catalyst components according to claim 1, in which the treatment with substance (c) is carried out at a temperature from 50° C. to 150° C. for a time of from 0.5 hour to 10 hours.

10. Catalyst components according to claim 1, in which substance (c), after the treatment therewith, is removed by evaporation.

11. Catalyst components according to claim 1, in which electron-donor compound ED is a substance which forms complexes with the magnesium dihalide but is removed for at least 70% by means of an extractive treatment with Al triethyl.

12. Catalyst components according to claim 11, in which the ED compound is selected from the group consisting of alkyl, aryl and cycloalkyl esters of maleic, fumaric, pivalic, methacrylic, succinic, malonic, phthalic and phosphorous acids.

13. Catalyst components according to claim 1, in which the titanium halide is selected from the group consisting of $TiCl_4$ and the phenoxy-titanium halides.

14. Catalyst components according to claim 1, in which the molar ratio between the ED compound and the titanium halide which are supported on magnesium dihalide is from 0.5:1 to 1:0.5.

15. Catalysts for polymerizing alpha-olefins $CH_2=CHR$, in which R is a $C_1-C_4$ alkyl radical or an aryl radical, and mixtures thereof with minor amounts of ethylene, comprising the product of the reaction between:

(A) a catalyst component according to claim 1;
(B) an Al alkyl compound;
(C) an electron-donor compound.

16. Catalysts according to claim 15, in which the component (A) comprises an electron-donor compound ED which forms complexes with the magnesium dihalide but is removed for at least 70% by an extractive treatment with Al triethyl.

17. Catalysts according to claim 16, in which the electron-donor compound (C) is a compound which forms complexes with $MgCl_2$ but does not form complexes with Al triethyl under standard measurement conditions.

18. Catalysts according to claim 17, in which compound (C) is selected from the group consisting of alkyl-alkoxy-silane, aryl-alkoxy-silane, 2,2,6,6-tetramethyl-piperidine, 2,2,5,5-tetramethyl-pyrrolidine and 2,2,6,6-tetramethyl-piperidide-Al-diethyl.

* * * * *